United States Patent
Ren et al.

(10) Patent No.: US 9,098,513 B1
(45) Date of Patent: Aug. 4, 2015

(54) METHODS AND SYSTEMS FOR DIFFERENCING ORDERLY DEPENDENT FILES

(75) Inventors: Liwei Ren, Sunnyvale, CA (US); Qiuer Xu, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 13/595,107

(22) Filed: Aug. 27, 2012

(51) Int. Cl.
*G06F 17/30* (2006.01)

(52) U.S. Cl.
CPC .... *G06F 17/30067* (2013.01); *G06F 17/30628* (2013.01)

(58) Field of Classification Search
CPC .............. G06F 17/30; G06F 17/30067; G06F 17/30628
USPC .................................. 707/615, 616, 623, 624
See application file for complete search history.

(56) References Cited

U.S. PATENT DOCUMENTS

| | | | |
|---|---|---|---|
| 5,832,520 A | 11/1998 | Miller | |
| 6,233,589 B1 | 5/2001 | Balcha et al. | |
| 6,535,894 B1 | 3/2003 | Schmidt et al. | |
| 6,636,872 B1 * | 10/2003 | Heath et al. | 1/1 |
| 6,694,336 B1 * | 2/2004 | Multer et al. | 1/1 |
| 6,785,677 B1 * | 8/2004 | Fritchman | 1/1 |
| 7,089,270 B2 | 8/2006 | Ren et al. | |
| 7,661,102 B2 | 2/2010 | Ogle et al. | |
| 7,950,062 B1 * | 5/2011 | Ren et al. | 726/26 |
| 8,321,434 B1 * | 11/2012 | Ren et al. | 707/755 |
| 8,380,688 B2 * | 2/2013 | Gruhl et al. | 707/698 |
| 8,478,718 B1 * | 7/2013 | Ranade | 707/610 |
| 8,498,965 B1 * | 7/2013 | Ren et al. | 707/625 |
| 8,566,317 B1 * | 10/2013 | Ren et al. | 707/737 |
| 2001/0020272 A1 | 9/2001 | Le Pennec et al. | |
| 2001/0039497 A1 | 11/2001 | Hubbard | |
| 2002/0073330 A1 | 6/2002 | Chandnani et al. | |
| 2002/0147849 A1 | 10/2002 | Wong et al. | |
| 2005/0010576 A1 * | 1/2005 | Ren et al. | 707/100 |
| 2005/0254521 A1 | 11/2005 | Peng | |
| 2005/0256864 A1 * | 11/2005 | Semerdzhiev | 707/5 |
| 2007/0038681 A1 | 2/2007 | Pierce et al. | |
| 2007/0288533 A1 * | 12/2007 | Srivastava et al. | 707/203 |
| 2008/0082255 A1 * | 4/2008 | Takahata et al. | 701/201 |
| 2008/0159331 A1 * | 7/2008 | Mace et al. | 370/473 |
| 2008/0177799 A1 | 7/2008 | Wilson | |

(Continued)

OTHER PUBLICATIONS

RTPatch, Pocket Soft, Inc., 1 sheet [retrieved on Aug. 8, 2012], retrieved from the internet: http://www.pocketsoft.com.

(Continued)

*Primary Examiner* — Hosain Alam
*Assistant Examiner* — Ahmed Abraham
(74) *Attorney, Agent, or Firm* — Okamoto & Benedicto LLP

(57) ABSTRACT

Difference data is generated between a reference file and a target file that are orderly dependent having common blocks that appear in the same order in both the reference and target files. The difference data is generated by comparing hash values of chunks of the reference file against hash values of parts of the target file to identity copy operations between the reference and target files. Chunks of the reference file and parts of the target file are loaded into main memory to create hashes for comparison and unloaded from the main memory after exhaustion. The difference data is included in a difference file, which is provided to one or more endpoint computers. In an endpoint computer, the target file is reconstructed using a copy of the reference file and the difference data from the difference file.

18 Claims, 11 Drawing Sheets

(56) References Cited

U.S. PATENT DOCUMENTS

| | | | | |
|---|---|---|---|---|
| 2008/0243840 | A1* | 10/2008 | Bhandari | 707/6 |
| 2009/0044178 | A1* | 2/2009 | Aridor et al. | 717/143 |
| 2009/0248758 | A1* | 10/2009 | Sawai et al. | 707/203 |
| 2010/0191752 | A1 | 7/2010 | Lauther | |
| 2012/0016839 | A1* | 1/2012 | Yueh | 707/624 |
| 2013/0110779 | A1* | 5/2013 | Taylor et al. | 707/624 |

OTHER PUBLICATIONS

About Pocket Soft, 2 sheets [retrieved on Aug. 8, 2012], retrieved from the internet: http://www.pocketsoft.com/company.htm.

Xdelta—Wikipedia, the free encyclopedia, 2 sheets [retrieved on Aug. 8, 2012], retrieved from the internet: http://en.wikipedia.org/wiki/Xdelta.

R.C. Agarwal, et al "An appromixation to the greedy algorithm for differential compression", Jan. 2006, pp. 149-166, IBM J. Res & Dev. vol. 50, No. 1.

Remote Differential Compression—From Wikipedia, the free encyclopedia, 1 sheet [retrieved on Feb. 24, 2012], retrieved from the internet: http://en.wikipedia.org/wiki/Remote_Differential_Compression.

Roling hash—From Wikipedia, the free encyclopedia, 3 sheets [retrieved on Feb. 24, 2012], retrieved from the internet: http://en.wikipedia.org/wiki/Rolling_hash.

Rsync—From Wikipedia, the free encyclopedia, 7 sheets [retrieved on Feb. 24, 2012], retrieved from the internet: http://en.wikipedia.org/wiki/Rsync.

Dan Teodosiu, et al. "Optimizing File Replication over Limited-Bandwidth Networks using Remote Differential Compression", 2006, pp. 1-16, retrieved from the internet: ftp://ftp.research.microsoft.com/pub/tr/TR-2006-157.pdf.

* cited by examiner

COPY-list

[Reference address and length of record with lexical order # 1]

[Reference address and length of record with lexical order # 3]

[Reference address and length of record with lexical order # 5]

[Reference address and length of record with lexical order # 6]

[Reference address and length of record with lexical order # 9]

ADD-list

[Target record data and length of record with lexical order # 2]

[Target record data and length of record with lexical order # 7]

FIG. 9

METHODS AND SYSTEMS FOR DIFFERENCING ORDERLY DEPENDENT FILES

BACKGROUND OF THE INVENTION

1. Field of the Invention

The present invention relates generally to computer systems, and more particularly but not exclusively to differential compression and incremental file update.

2. Description of the Background Art

Computer files may need to be updated for a variety of reasons. As a particular example, computer security programs need to be periodically updated to incorporate new virus signatures, new document fingerprints (for data loss prevention), newly developed detection algorithms, and so on. An updated version of a file of a program may be generated in one computer and distributed to multiple computers that subscribe to receive updates. Subscribing computers receive the updated version of the file over a computer network, making it important to minimize the size of updates to reduce network bandwidth consumption.

One way of minimizing the size of updates is to perform a difference procedure on the updated version and old version of a file to generate a difference file, and send the difference file instead of the updated version of the file to subscribing computers. In a subscribing computer, the difference file is merged with the old version of the file to reconstruct the updated version of the file. Differential compression allows for reduced network bandwidth consumption and storage use because the resulting difference file is relatively small.

SUMMARY

In one embodiment, difference data is generated between a reference file and a target file that are orderly dependent having common blocks that appear in the same order in both the reference and target files. The difference data is generated by comparing hash values of chunks of the reference file against hash values of parts of the target file to identity copy operations between the reference and target files. Chunks of the reference file and parts of the target file are loaded into main memory to create hashes for comparison and unloaded from the main memory after exhaustion. The difference data is included in a difference file, which is provided to one or more endpoint computers. In an endpoint computer, the target file is reconstructed using a copy of the reference file and the difference data from the difference file.

These and other features of the present invention will be readily apparent to persons of ordinary skill in the art upon reading the entirety of this disclosure, which includes the accompanying drawings and claims.

DESCRIPTION OF THE DRAWINGS

FIG. 9 shows entries in a listing of COPY operations and a listing of ADD operations in accordance with an embodiment of the present invention.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
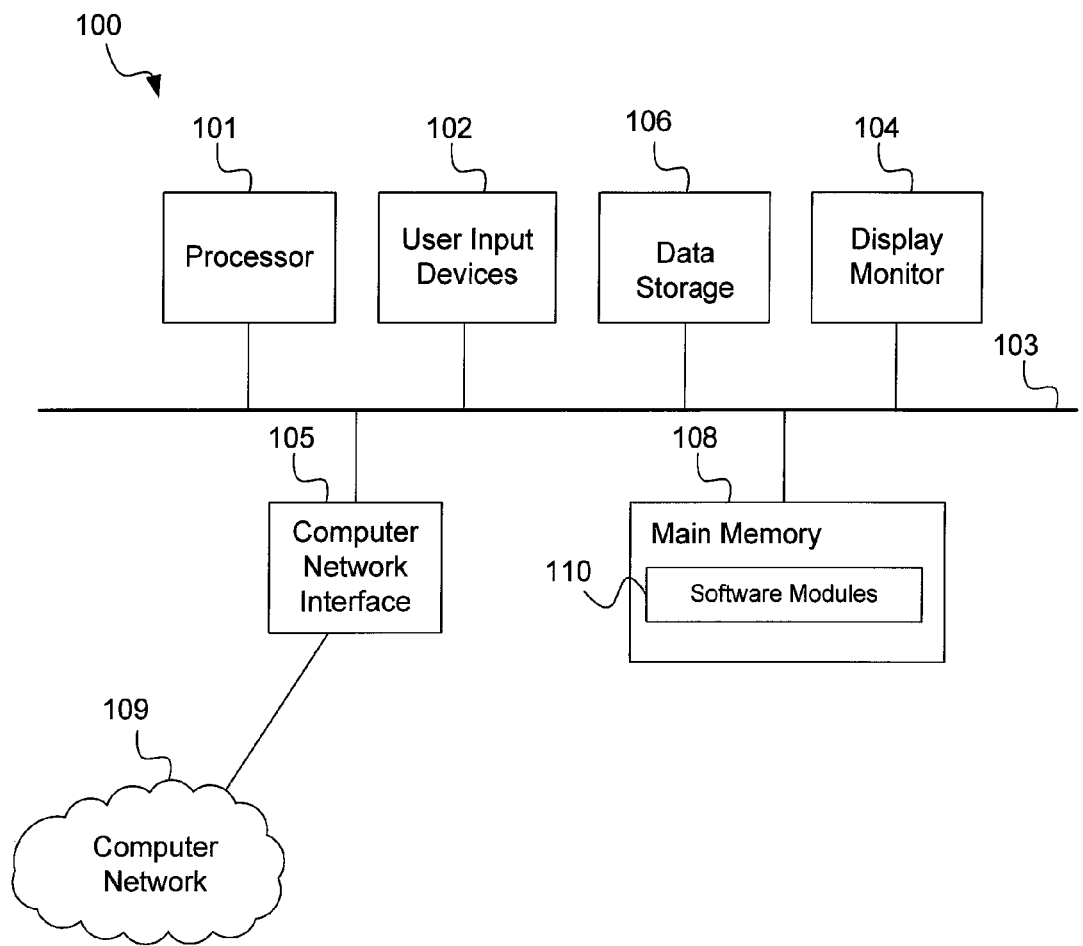
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as an endpoint computer or as part of a computer system, i.e., one or more computers, for example. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., volatile random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a difference engine. The computer 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 2A:
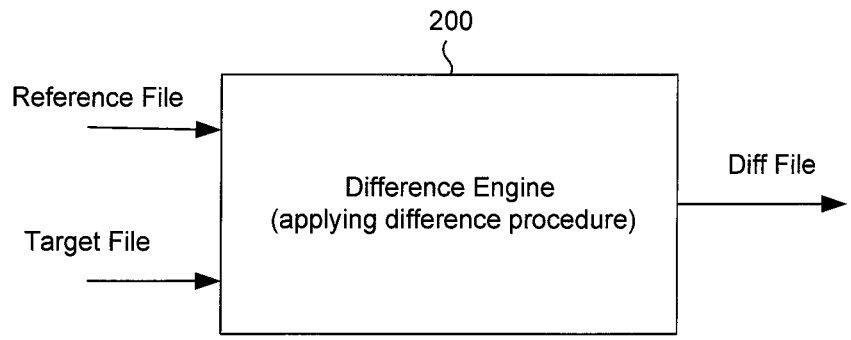
FIG. 2A shows a difference engine applying a difference procedure to generate difference data in accordance with an embodiment of the present invention.
Figure 2B:
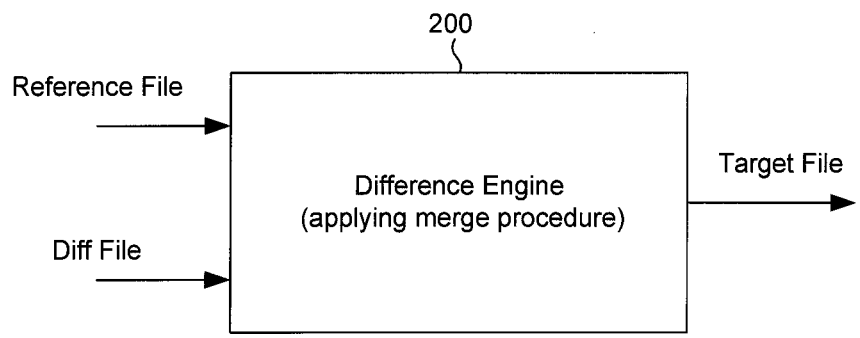
FIG. 2B shows a difference engine applying a merge procedure to reconstruct a target file in accordance with an embodiment of the present invention.

Embodiments of the present invention pertain to generation of difference data, which that may be transmitted and stored as a difference file (also referred to as a "diff" or "delta"

file). FIGS. 2A and 2B schematically illustrate generation of a difference file and generation of a target file, respectively, using a difference engine 200 in accordance with an embodiment of the present invention.

A reference file may be an old version of a file of a program and a target file may be a new, updated version of the file of the program. For example, a reference file may be an old pattern file comprising virus signatures or DLP document fingerprints, and the target file may be a new, updated pattern file comprising the latest virus signatures or DLP document fingerprints. Because the difference file is smaller in size than the new pattern file, distributing the difference file instead of the new pattern file saves network bandwidth and storage space. At a receiving computer with an old pattern file, the new pattern file may be reconstructed from the difference file and the old pattern file.

In the example of FIG. 2A, a difference engine 200 generates a difference file from a reference file and a target file. That is, given a reference file and a target file, the difference engine 200 generates difference data that is output as a difference file. In one embodiment, the difference engine 200 applies a differential compression procedure, also referred to as a "difference procedure," on the reference file and the target file to generate the difference data between the reference and target files. The difference engine then packages the difference data into the difference file in accordance with a difference file format.

The difference file describes the differences between the target file and the reference file. The differences may be identified by the difference engine 200 as a series of string edit operations that when performed on the reference file generates the target file. In the example of FIG. 2B, the difference engine 200 receives the reference file and the difference file, and applies a merge procedure to merge the reference file with the difference file to generate the target file. In one embodiment, the merge procedure generates the target file by applying a sequence of string edit operations to the reference file as indicated in the difference file.

The difference file may comprise a sequence of string edit operations that includes a COPY operation and an ADD operation. In one embodiment, a target file being reconstructed starts out empty. A COPY operation copies a block of data from a reference file at a well-defined address to the end of the target file, whereas an ADD operation adds a block of data to the end of the target file. A block may comprise a sequence of consecutive bytes of data. These string editing operations are further described with reference to FIG. 3.

Figure 3:
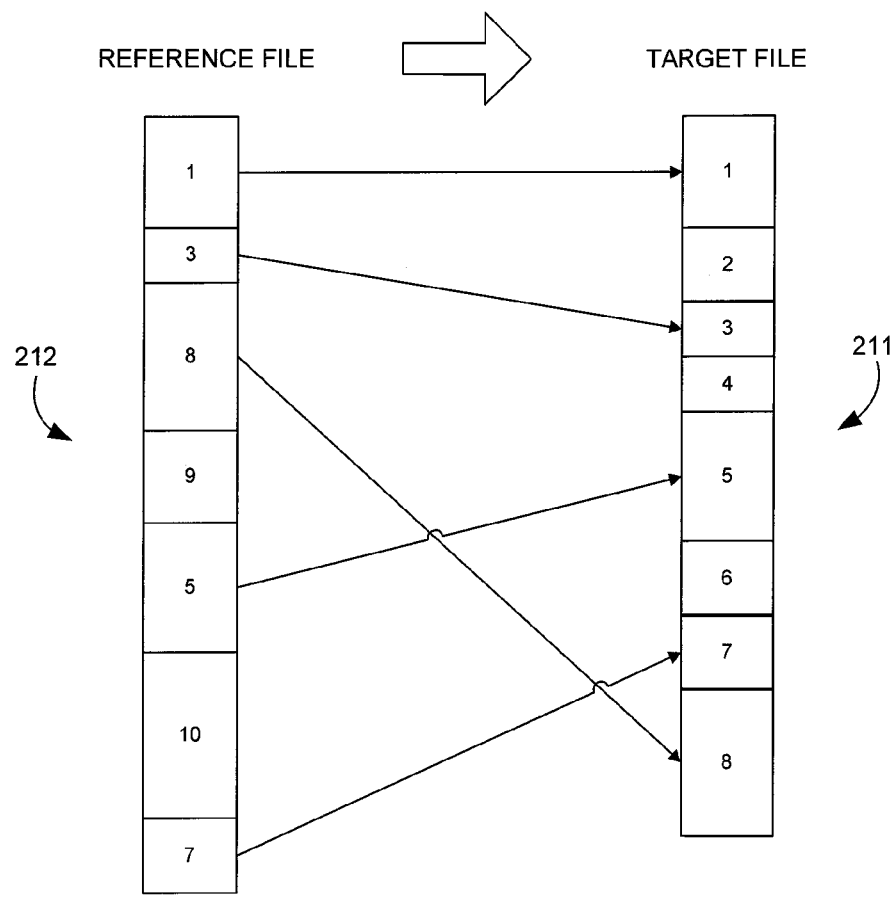
FIG. 3 schematically illustrates an example where a target file is reconstructed from a reference file by following a sequence of string edit operations in accordance with an embodiment of the present invention.

FIG. 3 schematically illustrates an example where a target file 211 is reconstructed from a reference file 212 by following a sequence of string edit operations in accordance with an embodiment of the present invention. In the example of FIG. 3, blocks that are similarly labeled have the same contents, i.e., the same blocks. That is, block 1 of the reference file 212 is the same as block 1 of the target file 211, block 3 of the reference file 212 is the same as block 3 of the target file 211, and so on. As a particular example, assume the block sizes in FIG. 3 are as follows:

Block 1 has 100 bytes
Block 2 has 60 bytes
Block 3 has 50 bytes
Block 4 has 50 bytes
Block 5 has 120 bytes
Block 6 has 60 bytes
Block 7 has 70 bytes
Block 8 has 150 bytes
Block 9 has 80 bytes
Block 10 has 180 bytes After identifying a sequence of string edit operations to reconstruct the target file 211 from the reference file 212, the sequence of string edit operations may be encoded in an efficient manner:

The sequence of string edit operations is formed in the order of ascending addresses of target blocks for encoding efficiency. As such, it is not necessary to specify the destination addresses for COPY and ADD operations.

A COPY operation is encoded as <src_address, length> where src_address is the offset of the copied block within the reference file 212 and the length is the block size.

An ADD operation is encoded as <data, length> where data is the data block being added to the target file 211 and the length is block size.

Continuing the example of FIG. 3, the target file 211 may be reconstructed from the reference file 212 by following a sequence of eight string edit operations as follows:

1. COPY<0,100>
2. ADD<block 2,60>
3. COPY<100,50>
4. ADD<block 4,50>
5. COPY<380,120>
6. ADD<block 6,60>
7. COPY<680,70>
8. COPY<150,150>

It is to be noted that it is advantageous for an efficient difference compression algorithm to favour more COPY operations rather than ADD operations. Essentially, a differential compression algorithm may involve identifying all efficient COPY operations.

A sequence of string edit operations may be encoded by the difference engine 200 into a single difference file. The difference file provides the information needed by a merge procedure to reconstruct the target file using the reference file. A difference file may have one of a variety of formats without detracting from the merits of the present invention.

Figure 4:
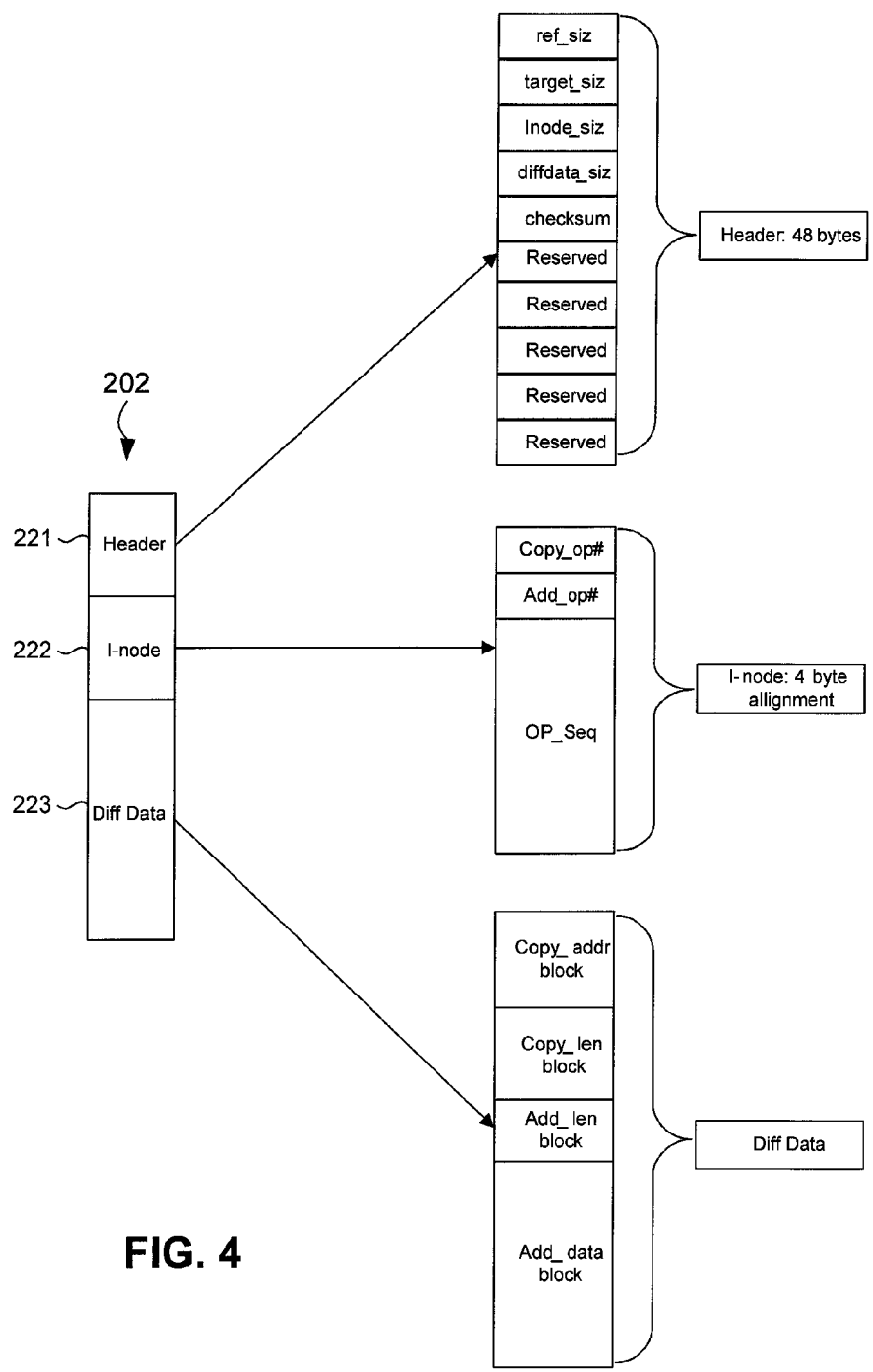
FIG. 4 schematically shows an example format of a difference file in accordance with an embodiment of the present invention.

FIG. 4 schematically shows an example difference file format in accordance with an embodiment of the present invention. In the example of FIG. 4, the difference file format 202 has three sections, namely a header section 221, an i-node section 222, and a difference data section 223. The header section 221 may include the metadata for the difference file. In the example of FIG. 4, the header section 221 is forty eight bytes in length, with the reference file size field (ref_siz) and the target file size field (target_siz) being eight bytes each in length, and the i-node size field (Inode_siz), the difference data size field (diffdata_siz), the checksum field, and the five reserved data fields (e.g., for alignment) being four bytes each in length. Other header formats may also be used.

The i-node section 222 may include metadata for the string edit operations and may be of varied size. A number of COPY operations (Copy_op#) and a number of ADD operations (Add_op#) may be indicated in fields that are four bytes in length. The sequence of edit operations (Op_seq) indicates whether each operation in the sequence is a COPY or an ADD operation. For example, each operation may be represented by one bit, where the bit is a logical one for a COPY operation and a logical zero for an ADD operation.

The difference data stored in the difference data section 223 comprises the specific edit operation data and may also be of varied size. The sequence of COPY addresses may be given together, in order, as a single block of data (Copy_addr block), where each COPY address is eight bytes in length. The sequence of COPY lengths may also be given together, in order, as a single block of data (Copy_len block), where each COPY length is four bytes long. Similarly, the sequence of ADD lengths may be given together, in order, as a single block of data (Add_len block), where each ADD length is four bytes long. Finally, the sequence of ADD data may be given together, in order, as a single block of data (Add_data block).

Figure 5:
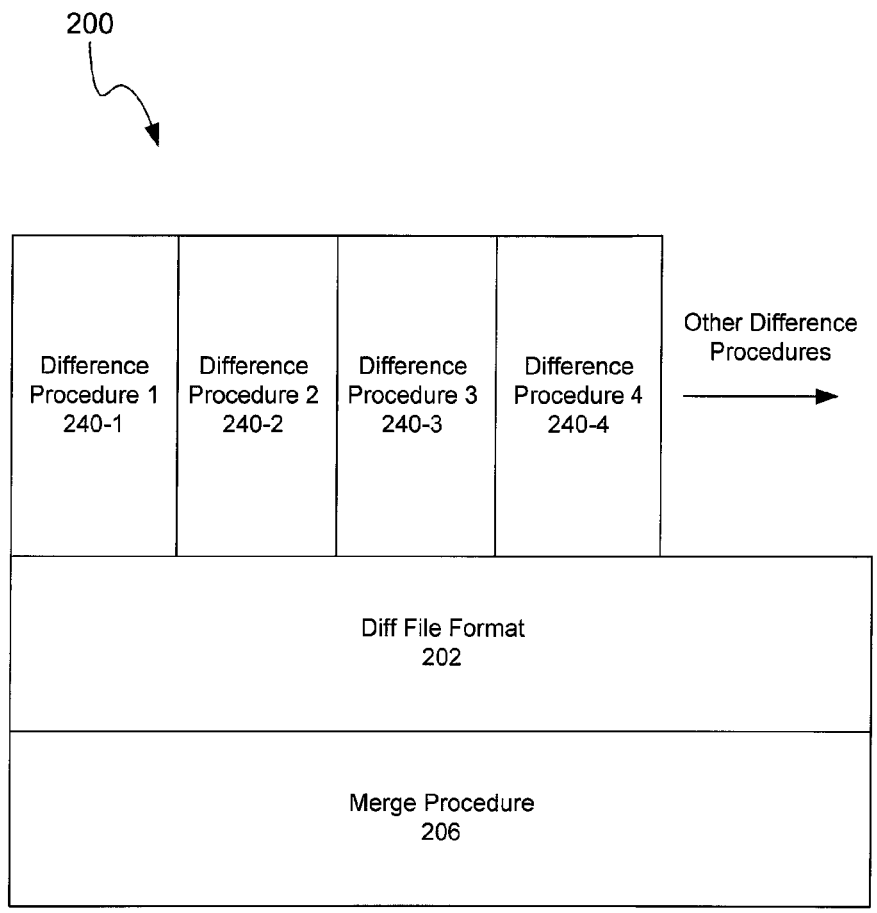
FIG. 5 shows a difference engine in accordance with an embodiment of the present invention.

FIG. 5 shows the difference engine 200 in accordance with an embodiment of the present invention. The difference engine 200 may be implemented as computer-readable program code for generating difference data for a reference file and a target file. In the example of FIG. 5, the difference engine 200 is extensible in that it may employ one or more difference procedures 240 (i.e., 240-1, 240-2, 240-3, 240-4, etc.), with a difference procedure 240 being optimized or particularly suited to generate difference data for a specific type of reference file. For example, a difference procedure 240-1 may be optimized or particularly suited for generating difference data for a reference file and target file that comprise a sequence of sorted data records, a difference procedure 240-2 may be optimized or particularly suited for generating difference data for a reference file having a file size smaller than a size N, a difference procedure 240-3 may be optimized or particularly suited for generating difference data for a reference file having a file size between the size N and a size M (where N<M), and a difference procedure 240-4 may be optimized or particularly suited for generating difference data for a reference file and a target file of any size that have been determined to be orderly dependent. The difference engine 200 receives a target file and a reference file, and selects the most suitable difference engine 240 based on the reference file, target file, or both. The difference engine 200 formats the resulting difference data in a difference file format, which in the example of FIG. 5 is the difference file format 202.

The difference engine 200 may include a merge procedure 206 for merging the reference file with a difference file to generate the target file. This allows the target file to be reconstructed in a remote computer. The merge procedure 206 may be used with difference data generated by any of the difference procedures 240. Accordingly, the difference engine 200 may have a plurality of difference procedures 240, a single difference file format 202, and a single merge procedure 206. An example pseudo code for the merge procedure 206 in accordance with an embodiment of the present invention is as follows:

1. Receive a difference file.
2. Decompress the difference file.
3. Validate checksum and other information.
4. Retrieve the operation sequence list, COPY list, and ADD list from the difference file.
5. Following the order defined in the operation sequence list, reconstruct the target file based on the COPY and ADD operations indicated in the COPY list and the ADD list.

Figure 6:
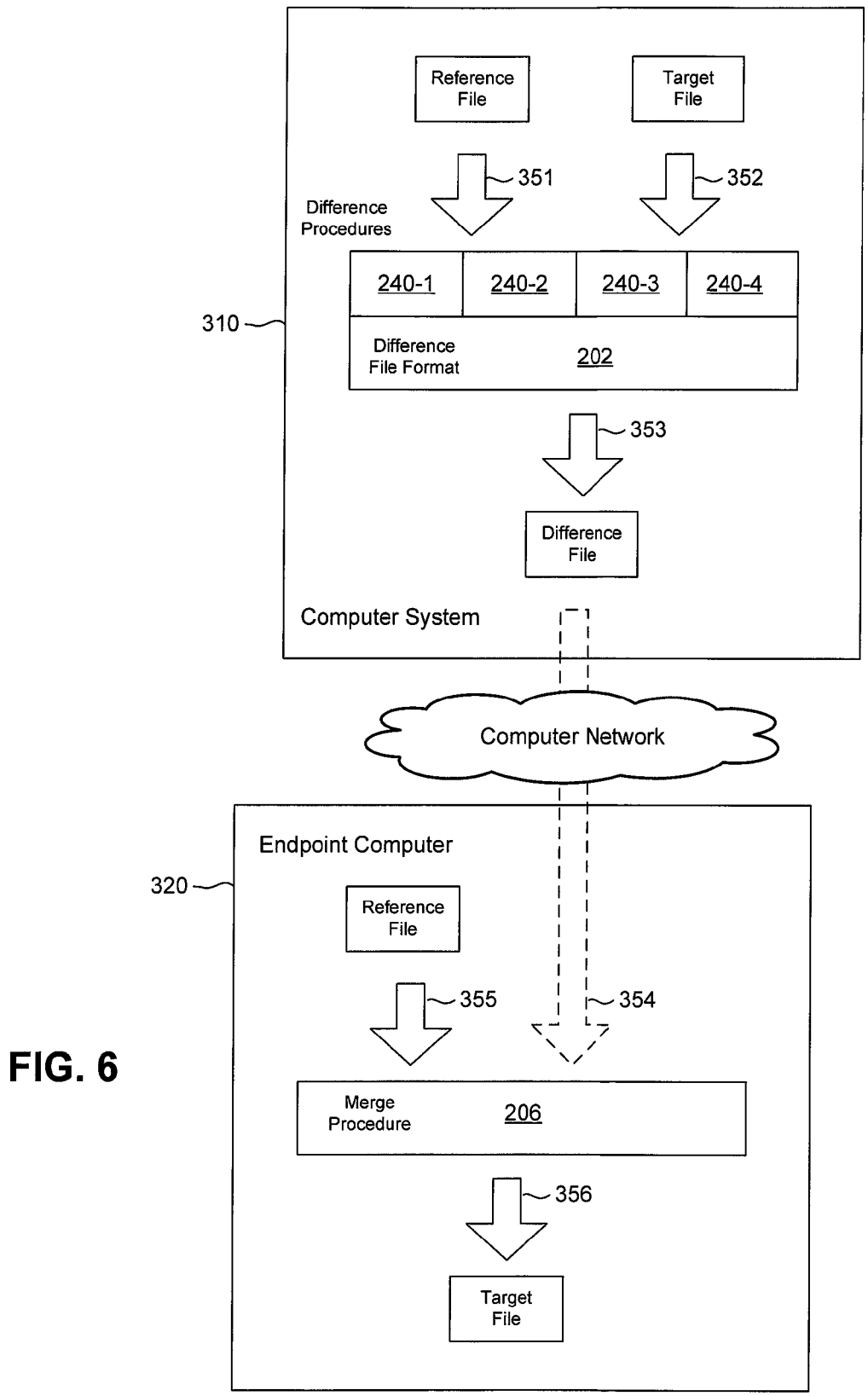
FIG. 6 shows a schematic diagram of a system for distributing files over a computer network in accordance with an embodiment of the present invention.

FIG. 6 shows a schematic diagram of a system for distributing files over a computer network in accordance with an embodiment of the present invention. In the example of FIG. 6, the system includes a publisher computer system 310 and an endpoint computer 320. The computer system 310 and the endpoint computer 320 communicate over a computer network, which in this example is over the Internet.

The computer system 310 may comprise one or more computers for publishing updates to files that are stored in one or more endpoint computers 320. It is to be noted that only one endpoint computer 320 is shown in the example of FIG. 6 for clarity of illustration. In general, the computer system 310 provides updates to a plurality of subscribing endpoint computers 320. In the example of FIG. 6, the reference file is an old file and the target file is an updated version of the old file. As a particular example, the reference file may be an old version of a pattern file for a computer security program (e.g., antivirus or DLP program), and the target file may be a new version of the pattern file.

In the computer system 310, the reference file (see arrow 351) and the target file (see arrow 352) are input to the difference engine. A difference procedure 240 is selected based on the reference file, the target file, or both. For example, the difference procedure 240-4 may be selected when the reference file and the target file are determined to be orderly dependent files. In that example, the difference procedure 240-4 is applied to the reference file and the target file to generate difference data, which is formatted into a difference file (see arrow 353) in accordance with the difference file format 202. The difference file is then transmitted from the computer system 310 to the endpoint computer 320 over the computer network (see arrow 354). The difference file may also be transmitted to other subscribing endpoint computers.

The endpoint computer 320 receives the difference file, and has a copy of the reference file but not the target file. In the endpoint computer 320, the difference file (see arrow 354) and the reference file (see arrow 355) are input to a difference engine, which applies the merge procedure 206 to the reference file and the difference file to reconstruct the target file (see arrow 356) in the endpoint computer 320. This allows the target file to be made available in the endpoint computer 320 without having to transfer the target file itself from the computer system 310 to the endpoint computer 320.

Figure 7:
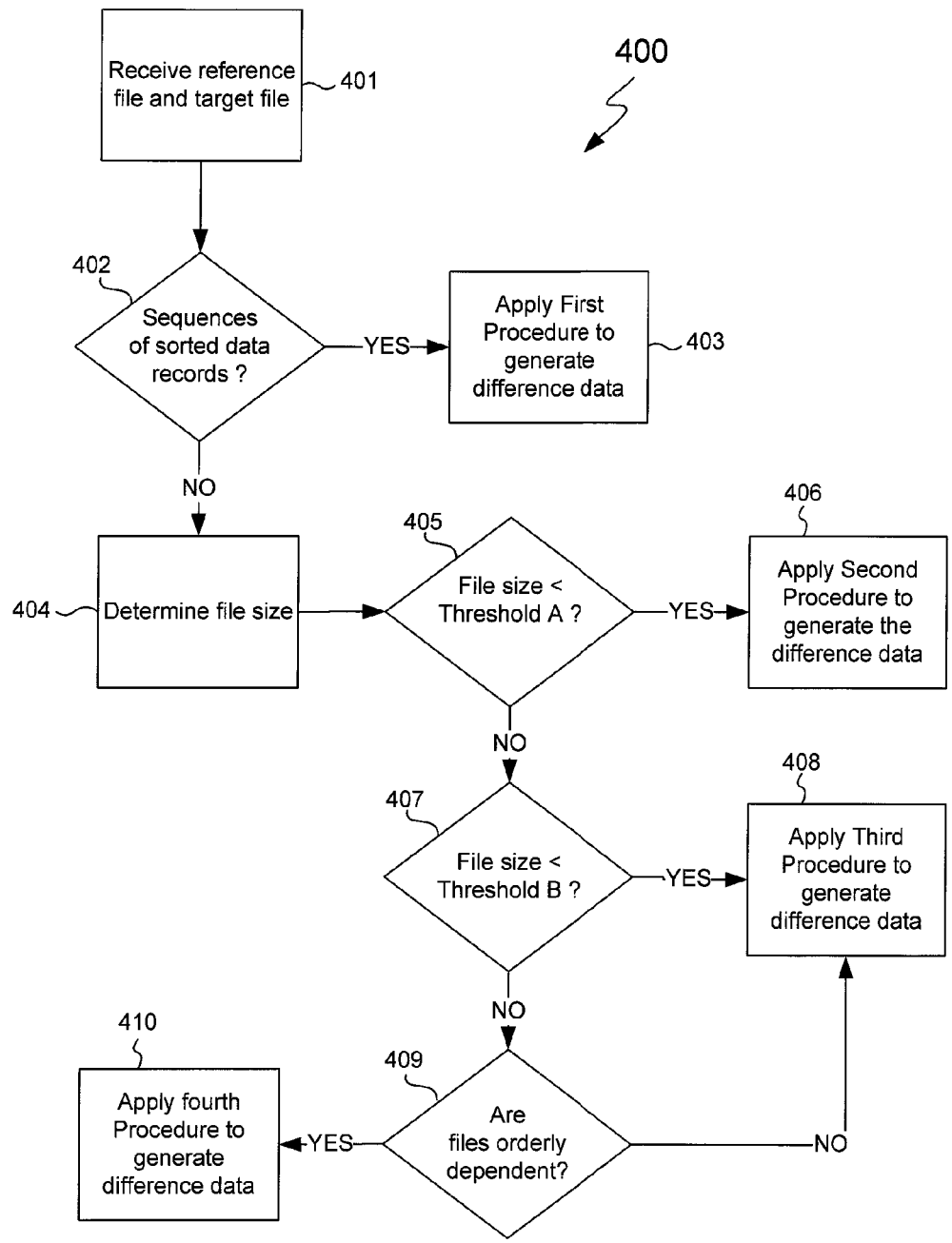
FIG. 7 shows a flow diagram of a method of generating difference data in accordance with an embodiment of the present invention.

FIG. 7 shows a flow diagram of a method 400 of generating difference data in accordance with an embodiment of the present invention. The method 400 may be performed by the difference engine 200, for example.

The method 400 may begin by receiving a reference file and a target file (step 401). A determination is made as to whether or not the reference and target files are sequences of data records that are sorted according to a same lexical ordering, also referred to herein as "sequences of sorted data records" (step 402). In accordance with an embodiment of the invention, the reference and target files that are received may be determined to be sequences of sorted data records. For example, the data records in both files may be ordered in alphabetical order based on data in a name field. For records with the exact same name, the lexical ordering may specify that those records are to be ordered, in relation to each other, in numerical order based on data in an account number field. If the reference and target files are sorted sequences of data records, then a first procedure (e.g., difference procedure 240-1) is applied by the difference engine 200 to generate the difference data between the reference and target files (step 402 to step 403). An exemplary first procedure is described below in reference to Table 1.

If the reference and target files are not sorted sequences of data records, then the size of one of the files is obtained (step 404). In one embodiment, the size of the reference file, but not necessarily the target file, is determined when creating difference data as a sequence of ADD and COPY operations. This is because the size of a hash table employed in creating the difference data depends on the size of the reference file under the COPY/ADD operations model. Because the hash table consumes main memory, the size of the reference file dictates the difference procedure applied by the difference engine 200.

If the file size of the reference file is determined to be less than a first threshold size (Threshold A), then a second procedure (e.g., difference procedure 240-2) is applied by the difference engine 200 to generate the difference data between the reference and target files (step 405 to step 406). An exemplary second procedure is described below in reference to Table 2. For example, if the second procedure is implemented on a 32-bit computer with 512 MB of main memory, then Threshold A may be sixty-four megabytes (64 MB).

If the file size of the reference file is determined to be less than a second threshold size (Threshold B), then a third procedure (e.g., difference procedure 240-3) is applied by the difference engine 200 to generate the difference data between the reference and target files (step 408). An exemplary third procedure is described below in reference to Table 3. For example, if the third procedure is implemented on a 32-bit computer with 512 MB of main memory, then Threshold B may be one gigabyte (1 GB). Otherwise, if the file size is determined to be greater than the second threshold size (Threshold B), then a determination is made as to whether or not the reference and target files are orderly dependent (step 407 to step 409). If the reference and target files are not orderly dependent, then the third procedure or another alternate procedure may be applied (step 409 to step 408), although these procedures may be relatively slow in generating the difference data.

If the reference and target files are determined to be orderly dependent of each other, then a fourth procedure (e.g., difference procedure 240-4) is applied by the difference engine 200 to generate the difference data between the reference and target files. The fourth procedure, also referred to herein as "orderly dependent file differencing" (ODD), is described later on below with reference to FIG. 10 and Table 4.

In accordance with an embodiment of the invention, if the reference and target files are sorted in a same manner, then the first procedure, such as the difference procedure 240-1, is applied by the difference engine to generate the difference data between reference and target files. Table 1 below shows an example pseudo-code for a first procedure for generating difference data between reference and target files that are sorted in the same manner.

TABLE 1

Input: Reference file R having N reference records R_R; a reference sorted-value array R_S that holds the sizes of all the reference records R_R; Target file T having M target records T_R; and a target size array T_S that holds the sizes of all the target records T_R.
Output: Compressed diff file
Procedure:
1. Get the N reference records R_R from reference file R in lexical order; and get the M target records T_R from target file T in lexical order.
2. Initialize COPY-list and ADD-list; let i = 0 and j = 0
3. If R_R [i] == T_R [j]
    Add reference address and length of R_R [i] into COPY-list and let i = i + 1, j = j + 1
    Else if R_R [i] < T_R [j], let i = i + 1
    Else if R_R [i] > T_R [j], add target record data and length of T_R [j] into ADD-list and let j = j + 1
4. If i < N and j < M, go to step 3
5. If j < M, add remain target data and length from T_R[j] into ADD-List
6. Modify the COPY-list and ADD-list as instructed below, and then generate the sequence S:
    a. Size of S = Size of ADD-list + Size of COPY-list
    b. Values of S indicate COPY or ADD for the corresponding record
7. Compute checksum; pack checksum, S, COPY-list and ADD-list into one diff file.
8. Apply compression algorithm/tool to diff file It is to be noted, that step 6 of the first procedure of Table 1 may include the enhancement of modifying both COPY-list and ADD-list prior to generating the S sequence. The modifications merge consecutive COPYs into a single COPY and consecutive ADDs into a single ADD. For example, the modifications may be implemented as follows.

1. For the COPY-list as {<dest_address[k], src_address[k], length[k]>|1≤k≤K}, if src_address[k]+length[k]= src_address[k+1], . . . , src_address[k+m−1]+length[k+ m−1]=src_address[k+m], we can merge the m+1 COPYs into one COPY operation as <dest_address[k], src_address[k], length[k]+ . . . +length[k+m]>.
2. For the ADD-list as {<dest_address[k], data[k], length [k]>, |1≤k≤K}, if dest_address[k]+length[k]=dest_address[k+1], . . . , dest_address[k+m−1]+length[k+ m−1]=dest_address[k+m], we can merge the m+1 ADDs into one ADD operation as <dest_address[k], concatenating <data[k], data[k+1], . . . , data[k+m]>, length[k]+ . . . +length[k+m]>.

The first procedure basically has two stages or groups of steps. A first stage of the first procedure involves identifying COPY/ADD operations with incremental sequences of sorted records in the reference and target files. The first stage corresponds to steps 1 through 5. A second stage, which includes steps 6 through 8, involves packing and encoding the difference file.

In the first stage of the first procedure, the inputs include reference file R having N reference records R_R in lexical order; a reference size array R_S that holds the sizes of all the reference records R_R; Target file T having M target records T_R in lexical order; and a target size array T_S that holds sizes of all the target records T_S. The first stage of the first procedure begins with step 1.

With reference to Table 1, in step 1, the first procedure gets the N reference records R_R in lexical order from reference file R (having sizes given in the reference size array R_S) and also gets the M target records T_R in lexical order from target file T (having sizes given in the target size array T_S). Note that, in one implementation, all these records are loaded into main memory of a computer apparatus. In another implementation, if main memory is not large enough, then subsets of these records may be loaded into main memory (for example, on an as needed basis) without affecting the operability of the procedure.

Per step 2, a COPY-list and an ADD-list are initialized. The COPY-list is to include a list of records that are to be copied from the reference file R to the target file T in a subsequent merge procedure. The ADD-list is to include a list of records that are not in the reference file R and are to be added to (inserted into) the target file T in a subsequent merge procedure. In addition, number variables i and j may be set to an initial value, which is zero in this example. The number variable i is used to point to a record in the reference file, while the number variable j is used to point to a record in the target file.

Per step 3, a comparison is made between the i-th record in the reference file (which is represented by the array value R_R[i]) and the j-th record in the target file (which is represented by the array value T_R[j]). The subsequent action depends on the result of this comparison.

If the i-th record in the reference file is the same as the j-th record in the target file (i.e. R_R[i]==T_R[j]), then an entry with the reference address and length (size) given by R_S[i] is added to the COPY-list. Thereafter, both i and j are incremented. The procedure then goes to step 4.

If the i-th record in the reference file is lexically less than the j-th record in the target file (i.e. R_R[i]<T_R[j]), then i is incremented (while j remains the same). A first record is lexically less than a second record if the first record is lower (earlier) in the lexical ordering. No entry is added to either the COPY-list or the ADD-list. The procedure then goes to step 4.

If the i-th record in the reference file is lexically greater than the j-th record in the target file (i.e. R_R[i]>T_R[j]), then an entry with the target record data and length (size) given by T_S[j] is added to the ADD-list. A first record is lexically greater than a second record if the first record is higher (later) in the lexical ordering. Thereafter, j is incremented (while i remains the same). The procedure then goes to step 4.

Per step 4, if i<N and j<M, then the procedure loops back to step 3. Otherwise (if either i=N or j=M), the procedure continues to step 5.

Per step 5, if j<M, then entries with the remaining target record data and the record lengths (sizes) given by T_S[j] (from the current value of j up to j=M) are added to the ADD-list. After step 5, the first stage of Procedure 1 is complete.

The second stage of the first procedure begins with step 6. Still referencing Table 1, per step 6, a sequence S is generated. The size or length of S is given by the sum of the number of entries in the ADD-list and the number of entries in the COPY-list (i.e. the size of the ADD-list plus the size of the COPY-list). Each value (entry) in sequence S indicates whether the corresponding record in the target file is to be copied using the COPY-list or added from the ADD-list. For example, a value of one may indicate that the corresponding record is to be copied from the reference file as indicated by the COPY-list, while a value of zero may indicate that the corresponding record is to be added from the ADD-list. Using ones and zeroes results in a compact size for the sequence S in that eight COPY or ADD instructions may be represented by a single byte (8 bits).

Per step 7, a checksum may be computed. The checksum may be over the sequence S, the COPY-list, and the ADD-list. The checksum, sequence S, COPY-list, and ADD-list may then be packed into a single diff (difference) file. Finally, in step 8, digital compression may be applied to reduce the size of the diff file.

Figure 8:
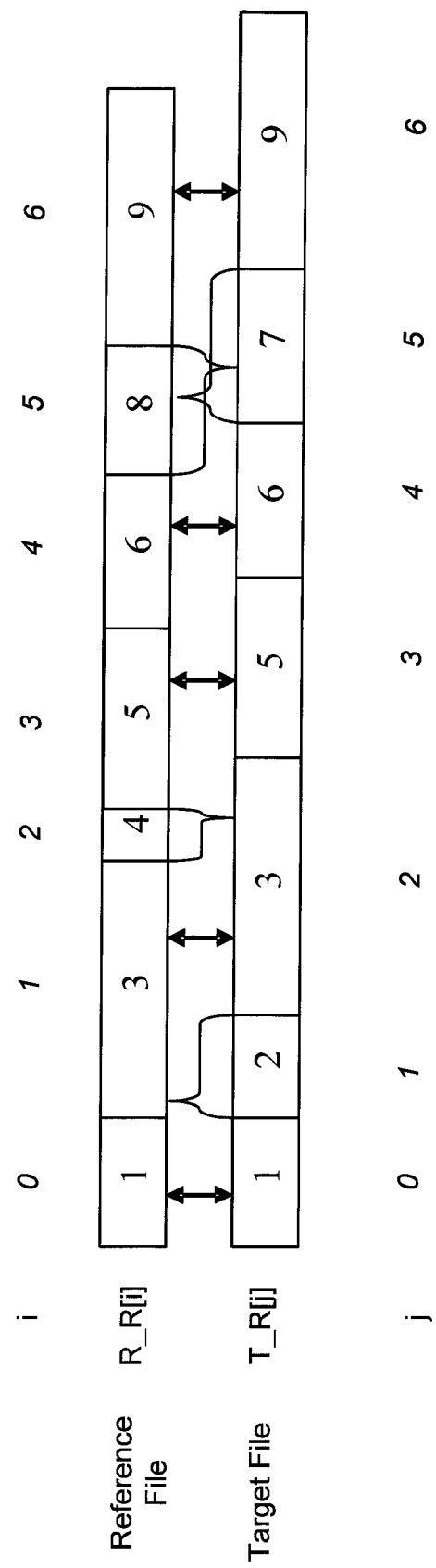
FIG. 8 schematically illustrates a difference procedure in accordance with an embodiment of the present invention.

An example application of the first procedure for generating difference data between reference and target files that are sorted sequences of data records is now described in relation to the example reference and target files depicted in FIG. 8.

In the example of FIG. 8, the reference file and the target file are schematically depicted with numbers representing the lexical order of the records from left to right in the drawing. In the example of FIG. 8, the reference file includes records with lexical order numbers in the following sequence: 1, 3, 4, 5, 6, 8, and 9. The target file includes records with lexical order values in the following sequence: 1, 2, 3, 5, 6, 7, and 9. In this example, records with the same lexical order numbers are the same record.

After steps 1 and 2 of the first procedure (see Table 1), i=0 and j=0. Now consider the performance of steps 3 through 5 given the example files of FIG. 8.

As seen in FIG. 8, R_R[0] and T_R[0] are the same record. Hence, in step 3, it is determined that R_R[0]==T_R[0]. As such, an entry with the reference address and length of R_R[0] is added to the COPY-list. Thereafter, both i and j are incremented to 1. Since i is less than the number of reference records N(=7, in this example), and j is less than the number of target records M (=7, in this example), the procedure loops back from step 4 to step 3.

Next, in step 3 of the first procedure, it is determined that R_R[1]>T_R[1] (since lexical order number 3>lexical order number 2). As such, an entry with the target record data and length of T_R[1] is added to the ADD-list. Thereafter, i remains at 1, and j is incremented to 2. Since i<N and j<M, the procedure loops back from step 4 to step 3.

Next, in step 3 of the first procedure, it is determined that R_R[1]==T_R[2] (both records having the lexical order number 3). As such, an entry with the reference address and length of R_R[1] is added to the COPY-list. Thereafter, i is incremented to 2, and j is incremented to 3. Since i<N and j<M, the procedure loops back from step 4 to step 3.

Next, in step 3 of the first procedure, it is determined that R_R[2]<T_R[3] (since lexical order number 4<lexical order number 5). As such, i is incremented to 3, and j remains at 3. No entry is added to either the COPY-list or the ADD-list. Since i<N and j<M, the procedure loops back from step 4 to step 3.

Next, in step 3 of the first procedure, it is determined that R_R[3]==T_R[3] (both records having the lexical order number 5). As such, an entry with the reference address and length of R_R[3] is added to the COPY-list. Thereafter, both i and j are incremented to 4. Since i<N and j<M, the procedure loops back from step 4 to step 3.

Next, in step 3 of the first procedure, it is determined that R_R[4]==T_R[4] (both records having the lexical order number 6). As such, an entry with the reference address and length of R_R[4] is added to the COPY-list. Thereafter, both i and j are incremented to 5. Since i<N and j<M, the procedure loops back from step 4 to step 3.

Next, in step 3 of the first procedure, it is determined that R_R[5]>T_R[5] (since lexical order number 8>lexical order number 7). As such, an entry with the target record data and length of T_R[5] is added to the ADD-list. Thereafter, i remains at 5, and j is incremented to 6. Since i<N and j<M, the procedure loops back from step 4 to step 3.

Next, in step 3 of the first procedure, it is determined that R_R[5]<T_R[6] (since lexical order number 8<lexical order number 9). As such, i is incremented to 6, and j remains at 6. No entry is added to either the COPY-list or the ADD-list. Since i<N and j<M, the procedure loops back from step 4 to step 3.

Finally, in step 3 of the first procedure, it is determined that R_R[6]==T_R[6] (both records having the lexical order number 9). As such, an entry with the reference address and length of R_R[6] is added to the COPY-list. Thereafter, both i and j are incremented to 7. Since i==N and j==M, the procedure loops moves forward from step 4 to step 5.

In step 5 of the first procedure, j==M, so there are no remaining entries to add to the ADD-list. The first stage is then complete. FIG. 9 shows entries in the COPY-list and ADD-list after completion of the first stage in this example.

As seen in FIG. 7, the COPY-list includes the reference address and record length for the records with lexical order numbers 1, 3, 5, 6 and 9, in that order. The ADD-list includes the target record data and record length for the records with lexical order numbers 2 and 7, in that order.

In step 6 of the first procedure, the size (in bits) of the sequence S would be the number of entries in the COPY-list (five) plus the number of entries in the ADD-list (two). Hence, the size of S would be seven bits. In this example, S={1, 0, 1, 1, 1, 0, 1}, where a value of 1 indicates that the corresponding record is to be copied from the reference file as indicated by the COPY-list, while a value of 0 indicates that the corresponding record is to be obtained from the ADD-list.

In step 7 of the first procedure, a checksum may be computed. The checksum may be over the sequence S, the COPY-list, and the ADD-list. The checksum, sequence S, COPY-list, and ADD-list may then be packed into a single diff (difference) file. Finally, in step 8, digital compression may be applied to reduce the size of the diff file.

In accordance with an embodiment of the invention, if the reference and target files are not sorted in a same manner, and the size of the reference file is less than a first threshold size (Threshold A), then a second procedure is applied by the difference engine 200 to generate the difference data between reference and target files (see FIG. 7, step 406). A pseudo-code for an example second procedure is described below in reference to Table 2.

The second procedure is advantageously configured to achieve a very good compression rate. However, this procedure requires relatively larger memory resources, so it is used for smaller file sizes.

TABLE 2

Input: Sliding hashing window size K; reference file R, reference file length Lr; target file T; and target file length Lt
Output: Compressed diff file
Procedure:
1. Create an empty chaining hash table H. The hash table size can be assigned as the smallest prime number larger than Lr
2. To generate hash records for the first (Lr − K + 1) substrings of length K of R based on Karp-Robin hash function:
    a. Calculate the hash value of the 1$^{st}$ substring R[1,K] (For performance purpose, for example, Horner's rule may be used.)
    b. Slide the window to calculate all other hash values sequentially (To boost performance, for example, an iterative formula may be used.)
    c. Resolving hash collisions by chaining hash records
    d. Each hash record contains the offset of the hashed substring
3. Let p = 1
4. If p > Lt − K + 1, go to step 13
5. Calculate the hash value h from the substring T[p, p+K−1]
6. Look up the hash table record H[h].
7. If H[h] is empty, let p = p + 1, go to step 4
8. Let m = 0
9. Walk through all records in the chaining list of H[h] to compare T[p, p+K−1] with R [s, s+K−1] where s is the offset of the hashed substring of R:
    a. If T[p, p+K−1] = R[s, s+K−1], extend the common substring forward the longest one with length t. If t > m, let m = t and q = s.
    b. Get next record
10. If m = 0, let p = p + 1 and go to step 4
11. Get a COPY operation as COPY: <p,q,m> and append this operation to the COPY list (C-list).
12. Let p=p + m and go to step 4
13. Use the C-list, the target file length to create the ADD list (A-list) with destination addresses in ascending order. Also form the operation sequence S.
    a. Size of S = size of A-list + size of C-list
    b. S is something like {1, 0, 1, 0, 1, 0, 1, 1} for our example
14. Pack checksum, S, C-list and A-list into diff file.
15. Apply compression algorithm to compress the diff file The second procedure in the example of Table 2 basically has three stages or groups of steps. A first stage of the second procedure involves pre-processing the reference file to create a hash table. The first stage corresponds to steps 1 and 2. A second stage involves identifying copy operations with reasonably long substring matches based on a "greedy" strategy. The second stage includes steps 3 through 12. Lastly, a third stage packs and encodes the diff file. The third stage corresponds to steps 13 through 15.

In accordance with an embodiment of the invention, if the file size is greater than the first threshold size (Threshold A) and less than a second threshold size (Threshold B), then a third procedure is applied by the difference engine 200 to generate the difference data between reference and target files. A pseudo-code for an exemplary third procedure is described below in reference to Table 3.

The third procedure is advantageously configured to achieve a reasonably good compression rate but generally not as good as the first and second procedures. Advantageously, the memory resources required by the third procedure is less than that required by the second procedure. This allows the third procedure to be used with larger (intermediate) size files.

TABLE 3

Input: Sliding hashing window size K; reference file R, reference file length $L_r$; target file T; and target file length $L_t$
Output: Compressed diff file
Procedure:
1. Create an empty chaining hash table H. The hash table size may be assigned as the smallest prime number larger than 2*Lr/B where B is the block size. The default block size B = 16.
2. Divide the whole reference file into N blocks with block size B (the last block size may be less than B).
3. For each block from the N blocks, one generates the hash value h from the 1$^{st}$ substring of length K. If the h-th slot (corresponding to hash value h) of the
   hash table is empty, set this slot H[h] with the offset, otherwise, do the same for the next offset of the block until the empty slot of the hash table is found and set the empty slot with the offset. (This technique handles hash collisions in a different manner from the conventional xdelta algorithm.) If this block is exhausted without resolving the collision, nothing is done. In a preferred embodiment, a rolling hash function may be utilized to generate the hash values h. For example, the rolling hash function may be a Karp-Rabin rolling hash function.
4. Let p = 1
5. If p > $L_t$ − K + 1, go to step 13
6. Calculate hash value of the substring h = T[p, p+K−1]
7. Look up the hash table record H[h].
8. If H[h] is empty, let p = p + 1 and go to step 5
9. If T[p, p+K−1] ≠ R[s, s+K−1] where s = H[h] let p = p + 1 and go to step 5
10. Extend the match of the common substrings T[p, p+K−1] and R[s, s+K−1]
    forward/backward as T[p b, p+K+f−1] and R[s−b, s+K+f−1]. (Be cautious about the backward match that requires T[p−b, p+K+f−1] does not overlap the latest COPY block in C-list below.)
11. Get a COPY operation as COPY: <p−b, s−b, K+f+b> and append this operation to the COPY list (C-list).
12. Let p = p + f and go to step 5
13. Use the C-list, the target file length to create the ADD list (A-list) in ascending order of destination addresses. Also form the operation sequence S.
    a. Size of S = size of A-list + size of C-list
    b. S is something like {1, 0, 1, 0, 1, 0, 1, 1} for our example
14. Pack checksum, S, C-list and A-list into diff file.
15. Apply compression algorithm to diff file The third procedure of Table 3 divides the reference file into blocks and generates a hash value for each block. One difference between the third procedure of Table 3 and the conventional xdelta algorithm is that the above third procedure has an improved technique to handle hash collisions.

In accordance with an embodiment of the invention, the hash collisions may be handled as described above in step 3 of Table 3. In particular, hash collisions are not resolved by chaining nor resolved by hash slot overwriting. Instead of chaining, hash collisions are resolved by finding an empty hash slot. This avoids the need for each node of the hash table to have extra memory for pointers to support chaining. Rather, each node advantageously requires less memory because it only needs to store the offset, not any pointers. This capability allows processing larger reference files. By not overwriting the hash slot with hash collisions, one increases the chances of more COPY operations. This enhancement over xdelta typically improves the compression rate. The improved compression rate is counter-intuitive because not using chaining means that the procedure may be less good at identifying portions of the reference file to copy to the target file. However, the savings in memory by not needing pointers at each node more than makes up for the slightly reduced effectiveness at identifying blocks to copy.

Another difference between the third procedure of Table 3 and the conventional xdelta algorithm is that the above third procedure, in its preferred embodiment, utilizes a Karp-Rabin rolling hash function. In contrast, the xdelta algorithm uses an Adler-32 rolling hash function.

Figure 10:
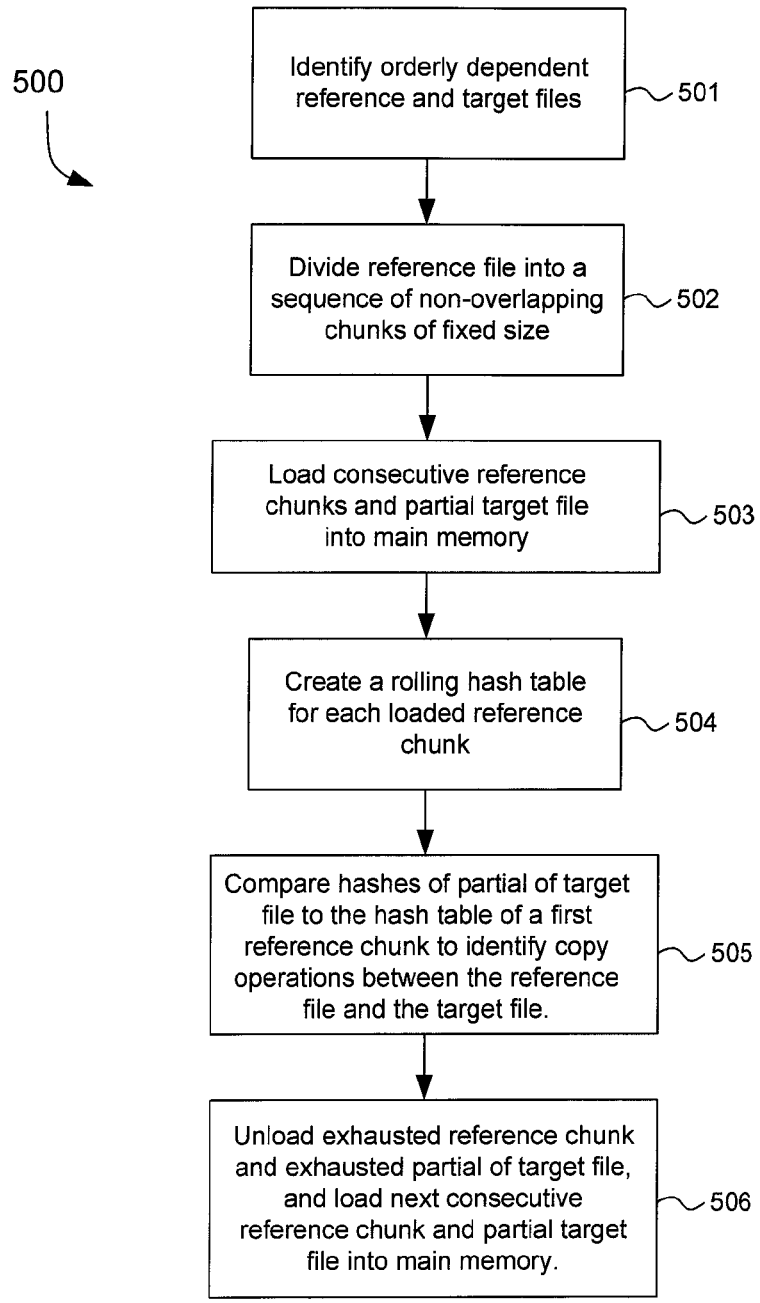
FIG. 10 shows a flow diagram of a method of generating difference data for orderly dependent files in accordance with an embodiment of the present invention.

In accordance with an embodiment of the invention, if the file size is greater than the second threshold size (Threshold B) and the reference file and the target file are orderly dependent, then a fourth procedure (Procedure 4) is applied by the difference engine 200 to generate the difference data between the reference and target files (see FIG. 7, step 410). FIG. 10 shows a flow diagram of a method 500 of generating difference data for orderly dependent files in accordance with an embodiment of the present invention. The method 500 may be performed as a fourth procedure of the difference engine 200.

In the example of FIG. 10, the reference file and the target file are identified to be orderly dependent. Two binary files are usually orderly dependent of each other when one of the files can be obtained by applying only the INSERT and DELETION string edit operations on the other file, and vice versa. Put another way, a property of orderly dependent reference and target files is that the target file can be reconstructed by performing only insert and/or delete string edit operations to the reference file, and vice versa. More formally:

1. Assume having two files that may have large sizes.
2. One uses the second procedure (see Table 2) on a theoretic computer with infinite main memory, without worrying about main memory usage, a sequence of COPY instructions is therefore generated as {<srcAddr[i], destAddr[i], len[i]>}.
3. If srcAddr[i]<srcAddr[j] implies destAddr[i]<destAddr[j], then the two files are orderly dependent.

Another property of two files that are orderly dependent is that blocks that are common to both files appear in the same order in both files. Put another way, a reference file and a target file are orderly dependent of each other when blocks common to both the reference and target files appear in the same order in both the reference and target files. The inventors discovered that determining that two files are orderly dependent is especially advantageous because it allows for a relatively efficient difference procedure that may be employed on orderly dependent files of any size.

Figure 11:
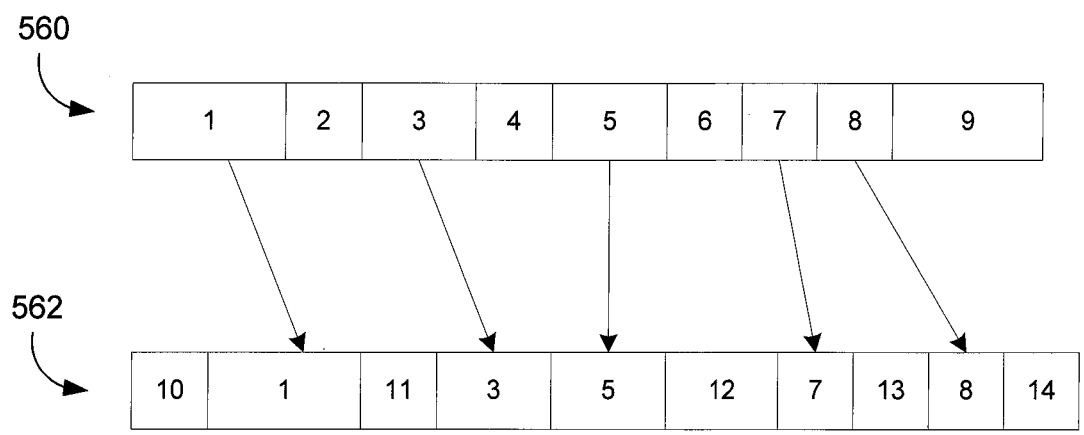
FIG. 11 schematically illustrates the concept of orderly dependent files in accordance with an embodiment of the present invention.

The concept of orderly dependent files is further illustrated with reference to FIG. 11. In the example of FIG. 11, blocks 1, 3, 5, 7, and 8 are common to both the files 560 and 562. Each block is a unit of data, such as a sequence of consecutive bytes. Because the files 560 and 562 are orderly dependent, the file 562 may be generated by deleting blocks 2, 4, 6, and 9 from the file 560 and by inserting blocks 10, 11, 12, 13, and 14 into the file 560. No other type of edit operation, such as COPY or PASTE operation, is needed.

As noted above, a useful property of orderly dependent files is that common blocks appear in the same order in both files. For example, in the example of FIG. 11, blocks 1, 3, 5, 7, and 8 are common to both the files 560 and 562 and also appear in the same order in both the files 560 and 562. In contrast, referring to FIG. 3, the reference file 212 and the target file 211 are not orderly dependent because the blocks 1, 3, 8, 5, and 7 are common to both the reference file 212 and the target file 211 but block 8 is not in the same order in both files. More specifically, block 8 is located between blocks 3 and 5 in the reference file 212, while block 8 is located after block 7 in the target file 211.

Continuing the example of FIG. 10, after the difference engine 200 receives the orderly dependent reference and target files, the reference file is divided into a sequence of non-overlapping chunks of fixed size (step 502). A chunk, which comprises a portion of a file, comprises a sequence of consecutive bytes of data. Consecutive chunks of the reference file and a partial of the target file are loaded in main memory (step 503). Two consecutive chunks of the reference file are loaded in main memory this example. The partial of the target file loaded in the main memory may be a small or relatively large part of the target file depending on main memory resources. It is to be noted that the entirety of the target file may not be loadable due to main memory constraints.

A rolling hash table is created for each of the loaded chunks of the reference file (step 504). In this example, a rolling hash table is created for a first chunk of the reference file and another rolling hash table is created for a second chunk of the reference file. The hash of a substring of the partial of the target file is compared to the hash table of the first reference chunk loaded in main memory to identify a COPY operation between the reference file and the target file (step 505). In other words, the hashes of the reference chunks and the partial of the target file are compared to find substrings that are common to both the reference and target files. The longest common substring may be found using a greedy strategy. Chunks of the reference file and the partial of the target file loaded in main memory and that have been exhausted, i.e., compared to find common substrings, are then unloaded from main memory (step 506). This frees main memory space to allow next consecutive chunks of the reference file and next following partial of the target file to be loaded into main memory.

A pseudo-code for an exemplary fourth procedure for generating difference data between orderly dependent reference and target files in accordance with an embodiment of the present invention is shown in Table 4.

TABLE 4

Input: Sliding hashing window size K, reference file R, reference file length $L_r$, target file T and target file length $L_t$, chunk size S
Output: COPY list
Procedure:
1. Split R into N chunks to get chunk offsets
2. Create two rolling hash tables H1 and H2 from the first two R chunks with hash table size as the smallest prime number larger than 1.5*S
3. Let p=1
4. If p > $L_t$−K+1, go to step 14
5. Calculate hash value h of the substring T[p,p+K−1]
6. Look up H1 and H2[h]
7. If both H1[h] and H2[h] are empty, let p=p+1, go to step 4
8. If H1[h] is empty and H2[h] is not empty
   a. Let H1=H2
   b. Create a new hash table from the next R chunk available and assign it to H2. Let H2=NULL if there is no chunk anymore.
9. Let m=0
10. Walk through all records in the chaining list of either H1 to compare T[p, p+K−1] with R[s, s+K−1] where s is the offset of the hashed substring of R:
   a. If T[p,p+K−1] = R[s, s+K−1], extend the common substring forward the longest one with length t. If t > m, let m=t and q=s.
   b. Get next record
11. If m=0, let p=p+1 and go to step 4
12. We get a COPY operation as COPY:<p,q,m> and append this operation to COPY list
13. Let p=p + m and go to step 4
14. Return the COPY list In the example pseudo-code of Table 4, a reference file R and a target file T are determined to be orderly dependent files. The reference file R is split into N chunks (Table 4, step 1). The first two chunks of the reference file R are loaded in main memory and a rolling hash table is created for each of the chunks (Table 4, step 2). A hash value of the substring of the target file T beginning at p and ending at p+K−1, i.e., T[p,p+K−1], is calculated and compared to hash values of the chunks of the reference file R, i.e., H1[h] and H2[h], to find the longest substring that are common to both the currently loaded chunks of the reference file R and partial of the target file T as per a greedy algorithm (Table 4, steps 5 to 10). Common substrings are formed as blocks for a COPY operation (Table 4, step 12). Chunks of the reference file R and partials of the target file T are loaded into main memory for comparison and then unloaded out of main memory after exhaustion to make room for other chunks and partials until the reference file R and the target file T are completely compared against each other to identify COPY operations that are added to the COPY list (Table 4, step 14). The COPY list and a corresponding ADD list are then included in a difference file that may be transmitted to subscribing endpoint computers that want to reconstruct the target file from the reference file. It is to be noted that in the computer system where the difference data is generated, the ADD list may be derived from the COPY list as simply those blocks in the target file that are not in the reference file.

Methods and systems for generating difference data have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method comprising:
   receiving a reference file and a target file that are orderly dependent of each other, the reference and target files having common blocks that appear in a same order in both the reference and target files;
   generating difference data between the reference and target files;
   generating a difference file comprising the difference data;
   receiving the difference file in a first computer over a computer network; and
   in the first computer, reconstructing the target file using the difference data from the difference file and a copy of the reference file stored in the first computer,
   wherein generating the difference data between the reference and target files comprises:
      dividing the reference file into a plurality of chunks;
      loading a first chunk and a second chunk of the reference file into a main memory of a second computer;
      loading a part of the target file into the main memory of the second computer;
      creating a rolling hash table of the first chunk and a rolling hash table of the second chunk of the reference file, the rolling hash table of the first chunk and the rolling hash table of the second chunk being separate rolling hash tables; and
      identifying substrings that are common to both the reference and target files by comparing the rolling hash table of the first chunk of the reference file to a hash of the part of the target file.

2. The method of claim 1 wherein generating the difference data between the reference and target files further comprises:
   unloading the first chunk of the reference file and the part of the target file from the main memory of the second computer;
   loading a third chunk of the reference file into the main memory of the second computer;
   creating a rolling hash table of the third chunk of the reference file; and
   identifying substrings that are common to both the reference and target files by comparing the rolling hash table of the third chunk of the reference file to the hash of the part of the target file.

3. The method of claim 2 wherein generating the difference data between the reference and target files further comprises:
   creating copy operations for substrings that are common to both the reference and target files.

4. The method of claim 3 wherein generating the difference data between the reference and target files further comprises:
   creating a copy list comprising the copy operations.

5. The method of claim 4 wherein generating the difference file comprising the difference data comprises:
   adding the copy list to the difference file.

6. The method of claim 1 further comprising:
   determining a size of the reference file, wherein the size of the reference file is determined to be greater than a first threshold size.

7. The method of claim 1 wherein the reference file comprises an old version of a pattern file comprising virus signatures for an antivirus and the target file comprises a new version of the pattern file.

8. The method of claim 1 wherein the reference file comprises an old version of a pattern file comprising fingerprints for data loss prevention and the target file comprises a new version of the pattern file.

9. A system comprising:
   a computer system that receives a reference file and a target file that are orderly dependent having common blocks that appear in a same order in both the reference and target files, generates a difference data for the reference and target files, formats the difference data into a difference file, and transmits the difference file to a plurality of endpoint computers; and
   an endpoint computer in the plurality of endpoint computers that receives the difference file, obtains the difference data from the difference file, and reconstructs the target file in the endpoint computer using a copy of the reference file and the difference data,
   wherein the computer system generates the difference data by dividing the reference file into a plurality of chunks, loading a first chunk of the reference file into a main memory of the computer system, loading a second chunk of the reference file into the main memory of the computer system, loading a part of the target file into the main memory of the computer system, creating a rolling hash table of the first chunk of the reference file, creating a rolling hash table of the second chunk of the reference file that is separate from the rolling hash table of the first chunk of the reference file, and comparing the rolling hash table of the first chunk of the reference file to a hash of the part of the target file to identify substrings that are common to both the reference and target files.

10. The system of claim 9 wherein the computer system generates the difference data by unloading the first chunk of the reference file from the main memory of the computer system, loading a third chunk of the reference file into the main memory of the computer system, creating a rolling hash table of the third chunk of the reference file, and comparing the rolling hash table of the third chunk of the reference file to the hash of the part of the target file to identify substrings that are common to both the reference and target files.

11. The system of claim 9 wherein the target file comprises an updated file for an antivirus program in the endpoint computer.

12. The system of claim 9 wherein the target file comprises an updated file for a data loss prevention (DLP) program in the endpoint computer.

13. The system of claim 9 wherein the endpoint computer follows a sequence of copy operations indicated in the difference file to reconstruct the target file.

14. A method comprising:
   receiving a reference file and a target file that are determined to be orderly dependent of each other, the reference and target files having common blocks that appear in a same order in both the reference and target files;

dividing the reference file into a plurality of chunks;

loading a first a chunk in the plurality of chunks, a second chunk in the plurality of chunks, and a part of the target file into a main memory of a computer system;

creating a rolling hash table of the first chunk;

creating a rolling hash table of the second chunk that is separate from the rolling hash table of the first chunk;

comparing the rolling hash table of the first chunk and a hash of the first part of the target file to identify a copy operation for reconstructing the target file in an endpoint computer using a copy of the reference file and a listing of copy operations;

including the listing of copy operations in a difference file; and providing the difference file to the endpoint computer.

15. The method of claim 14 further comprising:

unloading the first chunk from the main memory of the computer system;

loading a third chunk in the plurality of chunks into the main memory of the computer system;

creating a rolling hash table of the third chunk; and comparing the rolling hash table of the third chunk and a hash of the target file to identify another copy operation for reconstructing the target file in the endpoint computer using the copy of the reference file and the listing of copy operations.

16. The method of claim 14 further comprising:

in the endpoint computer, following the listing of copy operations to copy blocks from the copy of the reference file to the target file being reconstructed.

17. The method of claim 14 further comprising:

determining a size of the reference file to be greater than a threshold size.

18. The method of claim 14 wherein the target file is an updated version of a pattern file of a computer security program.

* * * * *